United States Patent [19]
Spaargaren

[11] Patent Number: 4,515,250
[45] Date of Patent: May 7, 1985

[54] SPRING CLUTCH FOR DUO-SERVO DRUM BRAKE

[75] Inventor: Robert Spaargaren, Granger, Ind.

[73] Assignee: Allied Corporation, Morristown, N.J.

[21] Appl. No.: 572,489

[22] Filed: Jan. 20, 1984

[51] Int. Cl.³ ............................................... F16D 65/38
[52] U.S. Cl. ......................... 188/79.5 GT; 188/196 R
[58] Field of Search .................. 188/79.5 R, 79.5 GE, 188/79.5 GC, 79.5 GT, 79.5 M, 331, 332, 333, 196 C, 196 R, 196 F, 196 P, 196 B, 196 BA, 216, 196 D, 77 W, 77 R; 192/111 A; 74/531

[56] References Cited
U.S. PATENT DOCUMENTS 3,003,592 10/1961 Kell .............................. 188/79.5 GE
3,069,764 12/1962 Swats et al. ............................ 29/436
3,149,500 9/1964 Swats et al. ............................ 74/531
3,335,822 8/1967 Edwards ....................... 188/79.5 GT
4,026,394 5/1977 Wright ................... 188/79.5 GC X Primary Examiner—Douglas C. Butler
Attorney, Agent, or Firm—Larry J. Palguta; Ken C. Decker

[57] ABSTRACT

A duo-servo drum brake (10) includes an adjusting mechanism (40) for effecting brake shoe (18, 20) adjustment during application of the brake. The brake (10) includes a cable (42) connected to the anchor pin (28) and one of the brake shoes (20), and to an adjuster connector (46) attached at its end. The adjuster connector (46) contains an elongated slot (49) receiving therein an end (61) of an opposing force clutch spring (60) mounted upon the adjusting pivot nut (56) of an extendible strut (50). The adjuster connector (46) is connected to a resilient return spring (70) anchored to the one brake shoe (20). A second opposing force clutch spring (62) is secured at one end (63) to the one brake shoe (20) and is mounted about the adjusting pivot nut (56) in order to prevent retraction rotation of the nut (56). The first and second opposing force clutch springs (60, 62) effect unidirectional rotation of the adjusting pivot nut (56) to extend the strut (50) and prevent counter rotation of the pivot nut (56) when the brake (10) is deactivated.

12 Claims, 3 Drawing Figures

SPRING CLUTCH FOR DUO-SERVO DRUM BRAKE

This invention relates to a spring clutch for a duo-servo drum brake assembly wherein a pair of opposing force clutch springs effect undirectional rotation of an extendible strut.

Automatic brake adjusting mechanisms include "application adjusters" which effect adjustment upon application of the brake. Application adjusters are disclosed in U.S. Pat. No. 3,893,548, entitled "APPLICATION ADJUSTER FOR DRUM BRAKE" and issued July 8, 1975, and U.S. Pat. No. 4,197,928 entitled "BRAKE SHOE GUIDE AND WHEEL CYLINDER RETAINER FOR A DRUM BRAKE" and issued Apr. 15, 1980. Both application adjusters are for duo-servo drum brakes which utilize a star wheel and adjuster lever to effect extension of an extendible strut positioned between contiguous ends of the brake shoes. While duo-servo brakes having a star wheel and adjuster lever extension mechanism have proven successful, the cost of the assembly remains expensive primarily because of the manufacturing cost of the star wheel. It is desirable to retain the basic structure of such a duo-servo drum brake, but yet reduce the cost by eliminating costly components such as the star wheel, adjuster lever, and adjuster pin.

The present invention provides a duo-servo drum brake with a novel adjusting mechanism for effecting brake shoe adjustment during application of the brake. The brake includes a cable connected to the anchor pin, one of the brake shoes, and to an adjuster connector attached at the end of the cable. The adjuster connector contains an elongated slot for control of the adjustment and which receives therein an end of an opposing force clutch spring mounted upon the adjusting pivot nut of an extendible strut. A resilient spring anchored to one of the brake shoes is attached to the adjuster connector in order to return the connector toward an initial position. A second opposing force clutch spring is secured at one end to the one brake shoe and mounted upon the adjusting pivot nut. The first and second opposing force clutch springs effect, respectively, rotation of the adjusting pivot nut to extend the strut and rotational immobilization of the pivot nut to prevent counter rotation when the brake is deactivated.

The adjusting mechanism of the present invention eliminates completely the aforementioned star wheel and adjuster lever, and permits a substantial cost reduction for an application adjuster on duo-servo drum brake.

One way of carrying out the invention is described in detail below with reference to the drawings which illustrate an embodiment, in which.

Figure 1:
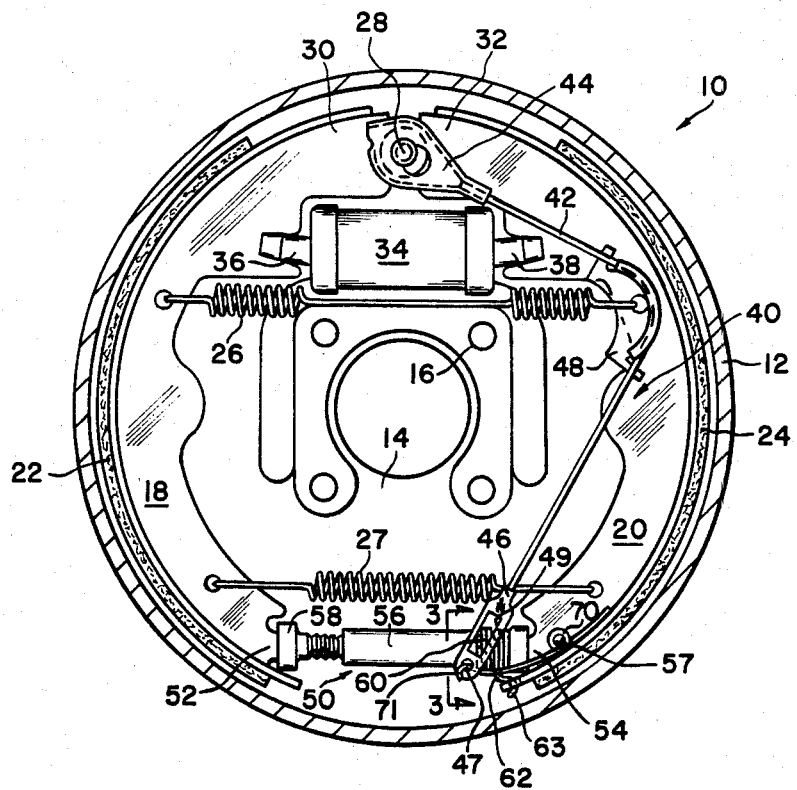
FIG. 1 is a side elevational view of a drum brake having an application adjuster in accordance with the present invention.
Figure 2:
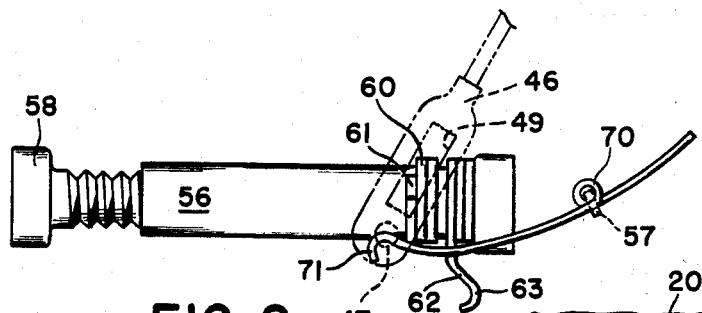
FIG. 2 is an enlarged view of the adjusting pivot nut and screw of the extendible strut with the opposed force clutch springs mounted thereon.

Referring now to the drawings, a drum brake generally indicated by reference numeral 10 includes a drum 12 mounted for rotation with the vehicle wheel. Stationary torque member or backing plate 14 is rigidly mounted to a non-rotating portion of the vehicle by bolts (not shown) inserted through apertures 16 and the backing plate 14. A pair of brake shoes 18, 20 are slidably mounted on the backing plate 14 for movement toward and away from the drum 12. Brake shoes 18, 20 have a conventional T-type cross-section and are well known to those skilled in the art, having been widely used for many years. Each of the brake shoes 18, 20 includes friction material 22, 24, respectively, carried thereon and adapted to engage the drum 12 when a brake application is effected. The return spring 26 extends between the shoes 18 and 20, yieldably urging the shoes away from drum 12. Return spring 27 effects the same result between the opposite contiguous ends of the brake shoes. An anchor pin 28 is provided between contiguous ends 30, 32 of the shoes 18 and 20, respectively, and the return spring 26 normally urges the ends 30, 32 into engagement with the pin 28 when the brake is released.

Fluid motor 34 is secured to the backing plate 14 and includes a pair of connecting links 36, 38 which interconnect motor 34 with the brake shoes 18, 20. The fluid motor 34 is a conventional wheel cylinder well known in the art, and is connected to the vehicle's master cylinder so that pressure generated in the master cylinder on initiation of braking application is transmitted to the motor to actuate links 36, 38 and urge the brake shoes 18, 20 into braking engagement with the drum 12.

Brake 10 further includes an adjusting mechanism generally indicated by numeral 40. Mechanism 40 includes a flexible cable 42 having fixture 44 on one end thereof adapted for connection with the anchor pin 28 and an adjuster connector 46 at the other end thereof. A cable guide 48 is rigidly secured to the brake shoe 20, and the cable 42 is threaded around the cable guide 48, so that upon movement of the shoe 20 during a brake application, the cable 42 will be carried with the shoe 20. Adjusting mechanism 40 further includes an adjusting strut 50 located between contiguous ends 52, 54 of the brake shoes 18, 20. Adjusting strut 50 comprises a nut 56 engaged with the end 54 of the shoe 18 and a screw 58 engaged with the end 52 of the shoe 20. The screw 58 is threadedly engaged with nut 56 and thus rotation of the nut 56 relative to screw 58 will extend the nut from the screw and thereby separate the ends 52, 54 of brake shoes 18, 20 an additional amount so that the brake shoes will thereafter be disposed in closer proximity to brake drum 12. Rotation of nut 56 is accomplished by opposed force clutch springs 60, 62 in conjunction with the adjusting connector 46 which is displaced by flexible cable 42 carried by brake shoe 20. The adjusting nut 56 rotatably receives end 54 of brake shoe 20. Mounted upon nut 56 is the pair of opposed force clutch springs 60, 62. Clutch spring 60 comprises a rectangular cross-seciton spring wrapped about nut 56 with its end 61 received within elongated opening 49 of adjuster connector 46. Clutch spring 62 also has a rectangular cross-section and is mounted upon nut 56 with end 63 received within opening 55 of shoe end 54, thereby anchoring spring 62 (see FIG. 3).

Figure 3:
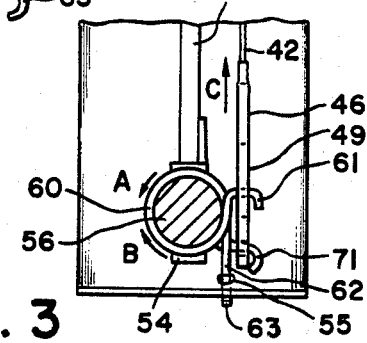
FIG. 3 is an end view taken substantially along view line 3—3 of FIG. 1.

Opposted force clutch spring 60 is wrapped about nut 56 so that upon retraction of cable 42, in FIG. 3 an upward movement of cable 42 in the direction of arrow C, spring 62 tightens about the nut 56 and rotates it in a counterclockwise direction indicated by arrow A. Clutch spring 62 is mounted on nut 56 such that any movement of the nut in a clockwise direction as indicated by arrow B, causes spring 62 to wrap tightly about the nut and thereby prevent rotation in the clockwise direction.

Flexible cable 42 has attached at one end thereof an adjsuter connector 46 which contains an elongated opening 49. Opening 49 receives therein the end 61 of clutch spring 60, with the engagement of these two parts designed so that clutch spring 62 is not actuated until the brake shoes have worn and the shoes are displaced sufficiently to cause end 61 to engage the bottom of opening 49. A cable return spring 70 is fixedly mounted by tab 57 on soe 20, and the spring end 71 is received within opening 47 of adjuster connector 46. Return spring 70 effects a return of the flexible cable 42 and adjuster connector 46 after brake application is terminated.

When a brake application is effected, pressure generated in a vehicle's master cylinder and transmitted to fluid motor 34 acts through connecting links 36, 38 to urge the brake shoes 18, 20 into frictional engagement with the drum 12, thereby retarding rotation of the latter. Thus, brake shoe 20 moves toward the drum 12. Cable guide 48 is carried with the brake shoe 20, and this causes cable 42 to be moved outwardly with shoe 20. The portion of cable 42 between cable guide 48 and anchor pin 28 will elongate and cause the portion of cable 42 between the guide 48 and adjusting connector 46 to shorten, thereby displacing the adjuster connector 46 in a generally upwardly and outwardly direction. If wear of the friction material 22, 24 is such that the movement of brake shoe 20 toward the drum 12 is sufficient to cause engagement of end 61 of spring 60 with the bottom of slot opening 49 of connector 46, then clutch spring 60 is caused to tighten about nut 56 as the cable 42 and adjuster connector 46 move in the direction of arrow C in FIG. 3. This causes counterclockwise rotation of nut 56 in the direction of arrow A, nut 56 rotating relative to screw 58 fixedly engaging end 52 of she 18. Thus, the extendible strut 50 extends outwardly and will, after the brake application has ceased, maintain the brake shoes in closer proximity to drum 12, in accordance with the brake shoe wear.

Upon deactivation of the brake application, the brake shoes 18 and 20 are urged inwardly by resilient springs 26 and 27, and the portion of cable 42 between the cable guide 48 and adjusting connector 46 will be allowed to elongate as the shoes move inwardly of the brake 10. This effects a loosening of the spring 60 from the nut 56, but simultaneously may result in a tightening of opposed force clutch spring 62 about nut 56. In order to prevent any clockwise rotation of nut 56 in the direction of arrow B which would permit retraction of the extended strut 50, spring 62 will tighten upon any slight clockwise rotation of the nut 56. Spring 62 has end 63 anchored in hole 55 and substantially precludes any clockwise rotation of nut 56, which prevents retraction of the brake shoes from their adjusted position. Upon brake deactivation, return spring 70 effect a return of connector 46 toward its initial position.

The slot opening 49 and adjusting connector 46 provide for a controlled adjustment of the brakes, the adjustment not occurring until the friction materials have worn sufficiently to result in springs end 61 engaging the bottom of slot opening 49 during a brake application. The end 63 of clutch spring 62 may be anchored in either the web or rim of the brake shoe. Likewise, there are alternative methods for anchoring the return spring 70 to the brake shoe 20.

Although this invention has been described in connection with the illustrated embodiment, it will be obvious to those skilled in the art that various changes may be made in the form, structure, and arrangement of parts without departing from the invention.

I claim:

1. In a drum brake, a backing plate for mounting on a non-rotating portion of a vehicle, a drum mounted for rotation with a member to be braked, a pair of brake shoes slidably mounted on said backing plate and in end-to-end relationship, fluid motor means for urging said brake shoes into frictional engagement with said drum, resilient means for yieldably urging said brake shoes away from said drum, an extendible adjusting strut between adjacent ends of said shoes, said adjusting strut including means for effecting extension of said strut upon actuation of the extension means which includes first and second clutch means engaging said strut, a force transmitting member interconnecting the backing plate, one of said shoes, and the extension means, the force transmitting member including an adjuster connector, and means for returning the adjuster connector toward an initial position, whereby movement of said one shoe toward the drum and in excess of a predetermined amount effects an actuating force through the force transmitting member and connector to actuate the first clutch means which engages the strut to effect rotation in one direction thereof and thereby extend the strut and adjacent ends of said shoes, and movement of said one shoe away from the drum effects rotatable disengagement of the first clutch means from said strut substantially simultaneously with the second clutch means engaging said strut to prevent rotation of the strut in an opposite direction.

2. The drum brake in accordance with claim 1, wherein said adjuster connector includes an elongated opening connectably receiving a portion of said first clutch means whereby movement of said one shoe toward said drum does not effect rotational engagement of the first clutch means with said strut until said brake shoe is worn.

3. The drum brake in accordance with claim 1, wherein the first and second clutch means comprise opposing force clutch springs and said extendible adjusting strut comprises an adjusting screw received in an adjusting pivot nut, the clutch springs mounted upon said pivot nut to effect rotation thereof in the one direction for extending said strut.

4. The drum brake in accordance with claim 1, wherein said extendible adjusting strut comprises an adjusting screw non-rotatably engaging the end of an adjacent shoe and an adjusting pivot nut rotatably engaging an end of the other adjacent shoe.

5. The drum brake in accordance with claim 1, wherein the return means comprises a return spring secured relative to one of said shoes and connected to said adjuster connector to effect return thereof.

6. The drum brake in accordance with claim 1, wherein said second clutch means is nonrotatably anchored relative to said extendible adjusting strut.

7. The drum brake in accordance with claim 1, wherein said first and second clutch means comprise opposed flat clutch springs each encompassing said adjusting strut whereby said first clutch means engages said strut to effect rotation in said one direction and rotatably release the strut for rotation in the opposite direction, and said second clutch means engages said strut to prevent rotation in said opposite direction and release said strut for rotation in the one direction.

8. A drum brake, comprising a backing plate mounted on a non-rotative portion of a vehicle, a drum mounted for rotation, a pair of brake shoes slidably mounted on said backing plate and in end-to-end relationship, fluid motor means for urging said brake shoes into frictional engagement with said drum, resilient means yieldably urging said brake shoes away from said drum, an extendible adjusting strut between adjacent ends of said shoes, said adjusting strut including opposed clutch means for effecting extension of said strut upon actuation of said clutch means, the opposed clutch means including means for rotating said extendible adjusting strut in one direction and means for preventing rotation of said adjusting strut in the opposite direction, a force transmitting member interconnecting the backing plate, one of said shoes, and the opposed clutch means, and means for returning said force transmitting member toward an initial position, whereby activation of said fluid motor means displaces said brake shoes toward frictional engagement with said drum and transmits force through said force transmitting member, and further displacement of said brake shoes due to wear of the shoes effects actuating engagement of said force transmitting member with said rotating means to rotate said adjusting strut in said one direction whereby the strut extends in accordance with the further displacement of said shoes, and deactivation of said fluid motor means accompanied by movement of said brake shoes away from frictional engagement with said drum effcts actuation of said rotation prevention means to prevent rotation of the strut in said opposite direction.

9. The drum brake in accordance with claim 8, wherein the rotation means and rotation prevention means each comprises a clutch spring mounted to said extendible adjusting strut, the clutch springs being oppositely mounted in order to rotate said strut in the one direction and prevent rotation in the opposite direction.

10. The drum brake in accordance with claim 8, wherein said return means comprises a spring secured to said one shoe and engaging said force transmitting member in order to return said member toward an initial postition.

11. The drum brake in accordance with claim 8, further comprising an adjuster connector attached to an end of said force transmitting member and to the rotating means.

12. The drum brake in accordance with claim 8, wherein the adjusting strut comprises an adjuster screw.

* * * * *